United States Patent [19]

Bislew

[11] 4,057,269
[45] Nov. 8, 1977

[54] HOSE COUPLING RETAINER ASSEMBLY
[75] Inventor: John E. Bislew, Kansasville, Wis.
[73] Assignee: J. I. Case Compny, Racine, Wis.
[21] Appl. No.: 694,201
[22] Filed: June 9, 1976

Related U.S. Application Data
[63] Continuation-in-part of Ser. No. 586,305, June 12, 1975, abandoned.

[51] Int. Cl.² ............................................. F16L 41/00
[52] U.S. Cl. ....................................... 285/158; 16/2; 285/192; 285/321
[58] Field of Search ................. 285/162, 192, 49, 321, 285/158, 223; 16/2; 174/153 G; 403/197, 59

[56] References Cited
U.S. PATENT DOCUMENTS

| | | | |
|---|---|---|---|
| 1,182,710 | 5/1916 | Rowell | 285/158 X |
| 2,845,812 | 8/1958 | Pobar | 16/2 X |
| 3,076,627 | 2/1963 | Huron | 285/61 X |
| 3,116,362 | 12/1963 | Rankin | 16/2 X |
| 3,486,523 | 12/1969 | Mullings | 285/192 X |
| 3,565,466 | 2/1971 | Mullings | 16/2 X |
| 3,761,601 | 9/1973 | Kaesser et al. | 285/158 X |

FOREIGN PATENT DOCUMENTS

| | | | |
|---|---|---|---|
| 1,083,777 | 9/1967 | United Kingdom | 285/158 |
| 555,302 | 8/1943 | United Kingdom | 248/56 |

Primary Examiner—Thomas F. Callaghan
Attorney, Agent, or Firm—Arthur J. Hansmann

[57] ABSTRACT

A hose coupling retainer assembly having a support member with an opening which receives an elastomeric member through which the hose coupling extends, all for snugly supporting the coupling and permitting some deflection in the alignment of the coupling and dampening vibrations to and from the coupling. The coupling is free to move axially of the elastomeric member, to thereby permit the deflection or tipping of the coupling relative to the elastomeric member without disconnecting the coupling.

2 Claims, 4 Drawing Figures

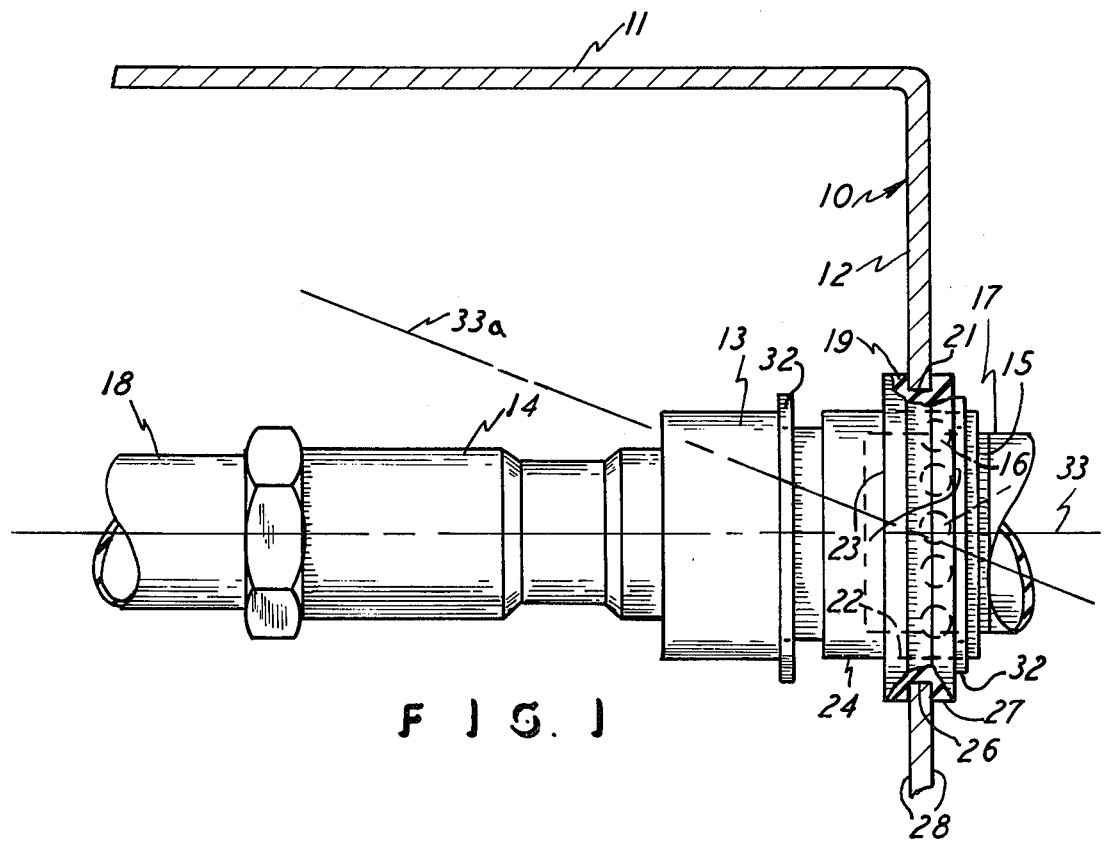
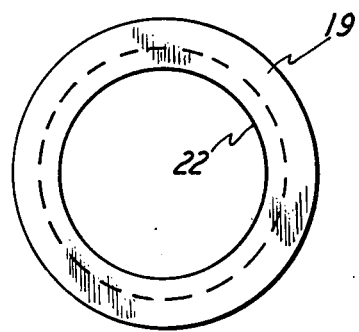
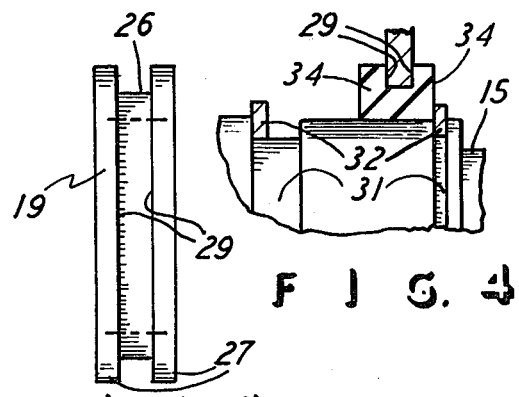

HOSE COUPLING RETAINER ASSEMBLY

This is a continuation-in-part of U.S. Pat. application Ser. No. 586,305 filed June 12, 1975, title "HOSE COUPLING RETAINER ASSEMBLY" and now abandoned.

This invention relates to a hose coupling retainer assembly, and, more particularly, it relates to a hose coupling retainer assembly for use in a tractor or the like where hydraulic hoses are utilized and the entire assembly is subjected to vibrations.

BACKGROUND OF THE INVENTION

The present invention is particularly related to the mounting and assembly of hose couplings on powered and working vehicles, such as tractors. In that environment, it is common and well known to have hydraulic hoses supported on the tractor and to have retainers and fasteners and the like which connect and suspend the hoses relative to the remainder of the tractor. The prior art is already aware of various devices and arrangements for supporting hoses and hose couplings on tractors and the like, and one such example is found in U.S. Pat. No. 2,699,961 wherein there is a support arm or bracket bolted to the tractor and extending to support a clamp which engages the hose coupling itself. Also, the prior art is aware of ring-shaped elastomeric members having U-shaped cross sections, for cushion supporting other members when the ring-shaped member is adequately supported, such as shown in the references cited in the parent patent application for the instant patent application.

In the present invention, the concern is to provide a hose coupling retainer assembly wherein the assembly is snugly and securely supported on its base member, such as a tractor, but yet the assembly is arranged so that it does not generate noise through vibrations and so that it is capable of slight deviations from its orientation to thereby accommodate bends or deflections in the hydraulic lines or the like. Accordingly, the present invention provides an assembly which accomplishes the aforementioned and overcomes the problems of readily and easily providing a hose coupling retainer assembly, and to have the arrangement so that the one element of the coupling is snugly mounted relative to a support member and yet is sufficiently sturdy in order to permit the usual connection and disconnection of the other element of the entire coupling.

Still further, the present invention provides a hose coupling retainer assembly which supports the coupling in a cushioned manner so that normal vibrations are dampened and do not create noise and do not tend to create vibrations which will cause breakage of the coupling or the hose itself, and, the present invention provides a simplified and reliable type of coupling mounting which sufficiently securely retains one portion of the coupling while the other portion of the coupling can be engaged and disengaged with the first portion at the time that the cushioned mounting member itself is retaining the first portion in a secure position.

Still further, the present invention provides a hose coupling retainer assembly which accomplishes the aforementioned objectives and which also permits the assembly to be deflected or tilted, relative to its longitudinal axis, but without creating forces on the assembly which would cause the assembly to become disconnected within itself.

Other objects and advantages will become apparent upon reading the following description in light of the accompanying drawings.

BRIEF DESCRIPTION OF THE DRAWINGS

FIG. 1 is a side elevational view of a hose coupling retainer assembly made according to this invention, and being partly broken away.

FIGS. 2 and 3 are end and side elevational views, respectively, of the cushioned member shown in FIG. 1.

FIG. 4 is a sectional view of a fragment of the assembly shown in FIG. 1.

DETAILED DESCRIPTION OF THE PREFERRED EMBODIMENT

The present invention is particularly useful in providing a hose coupling retainer assembly in the environment of a construction or agricultural tractor, such as that shown in U.S. Pat. No. 2,699,961. Accordingly, FIG. 1 shows a fragment of a tractor support member 10 which is actually the tractor foot rest or floor section 11 and which has the usual vertical portion 12. The hose coupling itself is shown to include the one female portion 13 having the extension designated 14, and it includes the removable and mating male portion 15, and, in the usual arrangement, balls 16 extend between the portions 13 and 15 and permit the portion 15 to be connected and disconnected with the portion 13, in the usual and well-known manner of providing and making the connection and disconnection between two hydraulic hose coupling portions, such as by tilting one portion relative to the other portion. Thus, the hose portion 17 extends from the coupling portion 15 and the hose portion 18 extends from the coupling portion 14, and thus hydraulic fluid would flow through the hoses 17 and 18 and through the coupling portions 13 and 15, all in the well-known and usual arrangement of these elements. In that arrangement, the assembled hose as described could create vibrations due to fluid pulsing through the assembly, and also the support member 10 itself may be subjected to vibrations which could be transmitted to the hose assembly described.

To provide a snug and secure mounting for the hose assembly, and to dampen the vibrations referred to, an elastomeric member 19 is snugly disposed in a circular opening 21 which extends through the support member portion 12. Therefore, the member 19 is annularly shaped and is preferably of a polyurethane material which is elastic and rubber-like but which is sufficiently firm to support the hose assembly shown and to retain itself in the opening 21 of the vertical portion 12, as shown. Thus, the member 19 has a central circular opening 22 extending therethrough from its opposite faces or walls 23, and the coupling member 13 has a circumferential surface 24 which is snugly disposed in the opening 22 which is actually somewhat pressed into the opening 22 so that the member 19 is pressed against the circular wall defining the opening 21 in the member 12. Also, the member 19 has a circumference designated 26 and that is of a size that results in the member 19 being snug in the opening 21 in that the circumference 26 is preferably slightly larger than the circumference defining the opening 21, and thus the member 19 is snapped into the opening 21. Further, the member 19 has a groove extending therearound, as defined by the circumference 26 and the outer circular portions 27 which flank the side surfaces or walls 28 of the portion 12, all as shown in FIGS. 1 and 4. Therefore, the elastomeric portions 27 have oppositely facing walls or surfaces 29, as designated in FIG. 2, which are in firm contact with the opposite surfaces 28 or the portion 12, and thus the elastomeric member 19 is snugly held by the portion 12 and is actually snapped therein for assembly therewith, as mentioned above.

The coupling portion 13 has spaced-apart snap ring grooves 31 extending therearound, and snap rings 32 are removably disposed in the grooves 31 and extend therefrom to alternately engage the end surfaces 34 of the member 19, as shown in FIGS. 1 and 4. Thus, the length of the member 19 along its longitudinal axis defined by the center of the central opening 22, is less than the spacing between the snap rings 32, and thus the member 13 is snugly supported by the elastomeric member 19 but it can move along the longitudinal axis 33 of the coupling assembly.

However, due to the resilience and elasticity of the member 19, and due to the wider spacing of the rings 32 compared to the axial length of the member 29, the coupling assembly can deviate from its longitudinal axis 33 by tipping relative to the portion 12 and at the wall thereof defining its opening 21, such that the coupling assembly could move and have the hose 18 deviate off the longitudinal axis 33 in any direction, such as shown by the center line 33a, but within a limited angle and thereby permit the accommodation of any normal and desired deviation for the coupling assembly in either its normal use or in making and breaking the connection between the elements 13 and 15 of the assembly.

Therefore, the elastomeric member 19 is annularly shaped and is arranged to have its exterior groove, as described, and thus presenting a U-shape in cross section, such as seen in FIG. 4. Accordingly, the support member portion 12 itself is actually imbedded in the elastomeric member 19, and the entire arrangement provides for the dampening of vibration to and from the coupling assembly and for sturdy and secure support of the assembly while permitting deflection of the assembly relative to its longitudinal axis 33 but yet securely retaining the assembly along its axis 33 so that it cannot inadvertently slip out of the elastomeric member 19 which assures holding the assembly axially, while permitting limited axial movement by virtue of the arrangement with the spacing of the snap rings 32 and by the snug mounting described. The invention therefore provides a mounting which has no metal-to-metal contact but which nevertheless restrains a quick-break type of coupling assembly against movement along the axis of the entire assembly. The entire assembly can tilt or tip relative to its longitudinal axis aligned with the opening 22, but such tilting will not be restricted by the spaced-apart rings 32, and thus the assembly will not be inadvertently disassembled because of its quick-break nature. However, disassembly can be effected by tilting one of the portions 13 and 15 relative to the other portion, such as by hand gripping the portions 13 and 15.

What is claimed is:

1. A hose coupling retainer assembly comprising a support member having spaced-apart and oppositely facing surfaces and having an opening extending through said member and between said surfaces, an elastomeric member disposed in said opening and having a groove extending exteriorly therearound and receiving the portion of said support member bordering said opening, for snap-fitting said elastomeric member snugly into said opening, said elastomeric member having spaced-apart and parallel end surfaces disposed at opposite axial ends of said elastomeric member, a hose coupling member having a uniformly cylindrical external wall, said elastomeric member having a uniformly circular central opening extending therethrough and of the diameter of said cylindrical external wall and snugly movably receiving said hose coupling member which extends through said central opening, said hose coupling member having snap ring grooves spaced apart greater than the distance of the spacing of said elastomeric member end surfaces and with said hose coupling member being free to slide back and forth in said central opening, and snap rings disposed in said snap ring grooves and extending radially into alternate and mutually exclusive abutment with said elastomeric member when said coupling member slides back and forth axially of said elastomeric member, for retaining said coupling member in said elastomeric member while permitting tipping of said coupling member relative to the axis of said central opening and under deflection of said elastomeric member.

2. The assembly as claimed in claim 1, wherein said elastomeric member is of a polyurethane material and is compressed against said support member, said coupling member includes a removable element extending spaced from said elastomeric member and separable from the remainder of said coupling member, and said coupling member being slidable in said elastomeric member to have said snap rings spaced from said elastomeric member end surfaces and thereby have said snap rings free of said end surfaces for the tipping of said coupling member in a conical pattern relative to the longitudinal axis of said elastomeric member.

* * * * *